United States Patent [19]

Gramlich et al.

[11] Patent Number: 5,483,243

[45] Date of Patent: Jan. 9, 1996

[54] RAMP-WEIGHTED CORRELATION WITH OVERSAMPLING

[75] Inventors: Gary A. Gramlich, Oro Valley; Roy H. Makino, Tucson; Dennis W. Morel, Tucson; Daniel J. Urbanski, Tucson; John R. Karobonik, Tucson, all of Ariz.

[73] Assignee: Hughes Missile Systems Company, Los Angeles, Calif.

[21] Appl. No.: 276,015

[22] Filed: Jul. 15, 1994

[51] Int. Cl.$^6$ .......................... G01S 13/00; G06F 17/15
[52] U.S. Cl. ..................... 342/189; 364/728.03
[58] Field of Search .................. 342/189, 145; 364/728.03; 367/904, 905

[56] References Cited

U.S. PATENT DOCUMENTS

| | | | |
|---|---|---|---|
| 3,412,334 | 11/1968 | Whitaker | 342/189 |
| 3,823,398 | 7/1974 | Horton et al. | 342/189 |
| 4,989,009 | 1/1991 | Zerkowitz | 342/189 |

Primary Examiner—Ian J. Lobo
Attorney, Agent, or Firm—Charles D. Brown; Randall M. Heald; Wanda K. Denson-Low

[57] ABSTRACT

A digital range correlator (50) for performing triangular ramp-weighted correlation relative to a reference word and providing an output data rate higher than the word rate. Two correlator channels (70, 80) are provided. Channel 70 provides a ramp-weighted segment sum over a word segment, with N word segments per L-bit word, wherein each received bit of a received word segment is multiplied by a corresponding ramp weight, and the corresponding product is in turn multiplied by the corresponding delayed reference word bit. The corresponding products over the word segment are accumulated to form a ramp-weighted word segment sum. Channel 80 provides a corresponding uniformly weighted word segment sum. The respective ramp-weighted and uniformly weighted word segment sums formed over the two preceding word segments are stored in a shift register. The ramp-weighted segment sums are scaled by +1 or −1 to represent the proper slope of the triangular weighting and accumulated. The uniformly-weighted segment sums are scaled by appropriate integers from 1 to N to represent the triangular weighting, and accumulated with the accumulated ramp-weighted scaled segment sums, and with appropriate normalization factors provide the correlator output signals. Digital Doppler or low pass filtering can be applied to improve the performance.

45 Claims, 7 Drawing Sheets

FIG. 3A CORRELATED SIGNAL SPECTRAL LINE

FIG. 3B UNCORRELATED SIGNAL SPECTRAL LINES

FIG. 3C (PRIOR ART) FREQUENCY RESPONSE OF SUMMER

Figure 3 ... Signal Line Spectra into Summer and Summer Response

FIG. 4A  TRIANGULAR WEIGHTING OVER TWO WORDS

FIG. 4B  EXAMPLE WITH 4 SEGMENTS PER WORD

FIG. 4C  RAMP WEIGHTS SEGMENT SUMS:

FIG. 4D  UNIFORM WTS SEGMENT SUMS:

FIG. 4E TRIANGULAR WEIGHTED SUM OVER TWO WORDS DERIVED FROM SEGMENT SUMS (RAMP AND UNIFORM)

FIG. 5

N = NUMBER OF SEGMENTS PER WORD

2L SAMPLES OF THE TRIANGULAR WEIGHTING

POWER SPECTRUM OF UNCORRELATED SIGNAL

FIG. 11

RANGE SIDELOBE RESPONSE VERSUS DOPPLER FREQUENCY

AMPLITUDE WEIGHTING:

UNIFORM OVER ONE WORD PERIOD, T

FIG. 15A

TRIANGULAR OVER TWO WORD PERIODS

FIG. 15B

TRIANGULAR OVER M WORD PERIODS, M>2

FIG. 15C

FREQUENCY RESPONSE OF WEIGHTED SUM:

RAMP-WEIGHTED CORRELATION WITH OVERSAMPLING

TECHNICAL FIELD OF THE INVENTION

This invention relates to digital correlators of the type used in target detection systems, and more particularly to a correlator employing ramp-weighting and oversampling to mitigate correlator performance degradation due to Doppler shift.

BACKGROUND OF THE INVENTION

Conventional digital correlation techniques are described in standard radar textbooks, such as Nathanson, *Radar Design Principles*, and Skolnick, *Introduction to Radar Systems*. Digital range correlation is described in commonly assigned U.S. Pat. No. 4,989,009.

Figure 1:
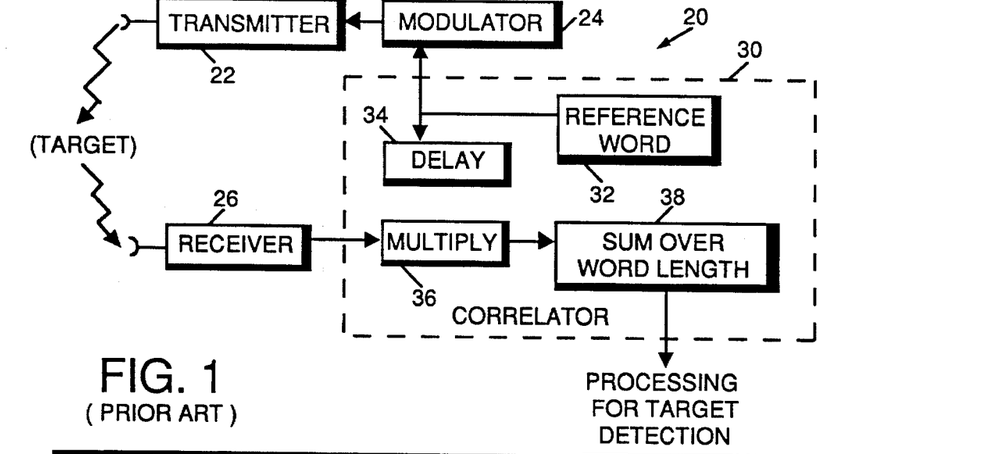
FIG. 1 is a schematic block diagram of a conventional range correlator useful for target detection.

A conventional range correlator 20 useful for target detection is shown in FIG. 1, and includes a transmitter 22 which produces a transmit signal modulated by modulator 24 with a reference word 32. The transmit signal is radiated toward the target and reflected to the receiver 26. The receiver output signal is provided to a correlator 30. The correlator includes a delay 34, a multiply 36 and a summer 38 for summing over a word length. The delayed reference word is multiplied with the receiver output signal. The output of the summer is provided to a processor for target detection.

For a received signal with zero Doppler shift, the receiver output signal has amplitude +A or −A, depending on the sample time and the value of the bit in the word sequence. The reference word 32 in the correlator 30 has amplitude +1 or −1, depending on the sequence of bits in the reference word. When the receiver output signal and the delayed reference word are aligned in time (i.e., when the target range delay is equal to the correlator delay provided by delay 34), the output of the multiplier is +A, (+A times +1=+A, or −A time −1=+A) over the entire word length. The output samples from the multiplier add together to maximize the sum over the word length. When the received signal and the delayed reference word 32 are not aligned in time, the output of the multiplier is +A or −A. Over the word length, the output samples from the multiplier add or subtract, so the summation over the word length by summer 38 is smaller than the maximum correlation peak.

Figure 2:
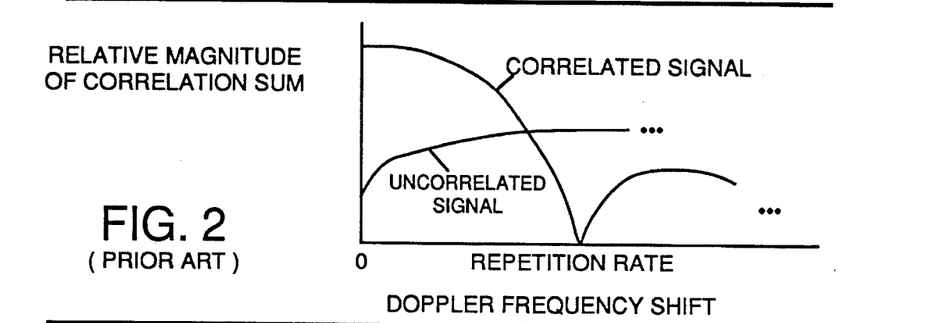
FIG. 2 is a plot of the relative magnitude of the correlator sum from the correlator of FIG. 1 as a function of Doppler frequency shift for both correlated and uncorrelated signals.

When the received signal has a Doppler frequency shift Fd, the signal sample at time t, into the correlator is not simply ±A, but varies sinusoidally, ±A sin $(2\pi Fdt)$. The sinusoidal variation changes the amplitude and polarity of the signal samples, so the correlator output is degraded when the signal has non-zero Doppler frequency shift. The degradation for a correlated signal and an uncorrelated signal are illustrated in FIG. 2.

The output of the summer 38 for a correlated signal decreases as the Doppler frequency increases, while the output of the summer for an uncorrelated signal increases as the Doppler frequency increases. The ability to distinguish between correlated and uncorrelated signals is degraded as the signal Doppler frequency shift increases. In addition, the conventional correlator 30 with output at the word repetition rate has essentially white noise at the output, so the signal-to-noise ratio of the correlated signal decreases as the signal Doppler frequency increases.

Figure 3A:
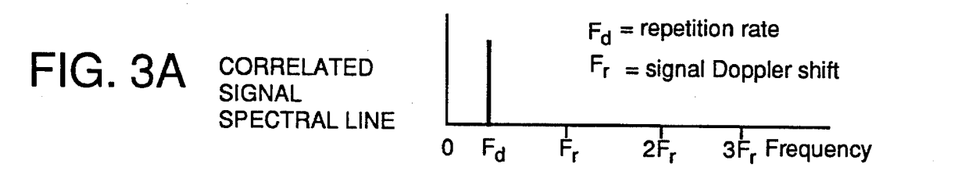
FIG. 3A shows the signal line spectra for a correlated signal.
Figure 3B:
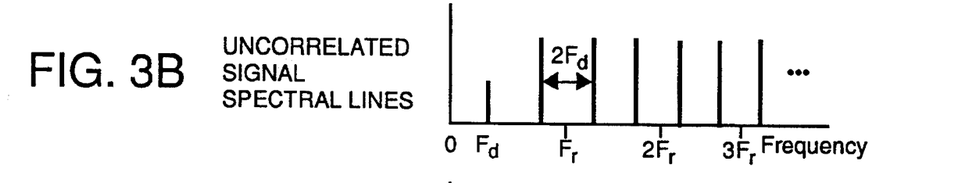
FIG. 3B shows the signal line spectra for an uncorrelated signal with steady state periodic modulation.
Figure 3C:
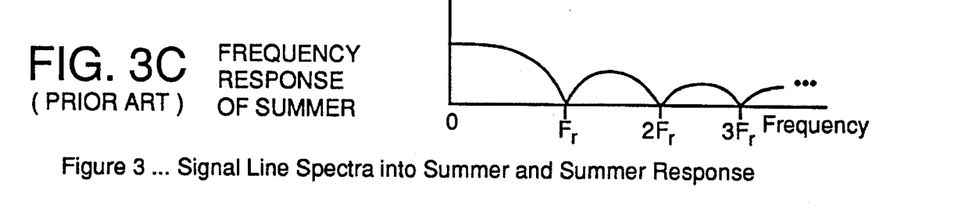
FIG. 3C shows the frequency domain response of the output of the correlator summer of the system of FIG. 1.

The correlation degradation with Doppler shift can be further explained by examining the correlation operation in the frequency domain. For steady state periodic modulation, FIGS. 3A–3C respectively show the signal line spectra for a correlated signal and an uncorrelated signal at the input to the summer 38, and FIG. 3C shows the response of the summer in the frequency domain. The correlated signal into the summer 38 is a constant amplitude sinusoid so there is only one spectral line at the signal Doppler frequency Fd. The uncorrelated signal is wideband with many sidebands at ±Fd from the repetition rate and its harmonics. The summer response to a sinusoid decreases as the frequency increases, with nulls at the repetition rate and harmonics, and sidelobe peaks between the nulls. When the signal Doppler shift is zero, the sidebands of the uncorrelated signal fall at the repetition rate and harmonics at the nulls of the summer. For non-zero Doppler shift, the sidebands of the uncorrelated signal move out of the summer nulls and degrade the ability to reject uncorrelated signals.

SUMMARY OF THE INVENTION

A method is described for performing correlation of a succession of received digital words in a serial bit stream with a reference digital word of bit length L having a reference word period, comprising the following steps:

providing a set of ramp weights W(k), where k=1 to L/N, where N is a number of word segments comprising the received digital word, each word segment having L/N bits;

forming a ramp-weighted sum over each word segment, said sum comprising the sum of a product of a reference word bit with a product of a corresponding received bit comprising the word segment with a ramp weight W(k);

forming a uniformly-weighted sum over each word segment, said sum comprising the sum of a product of a reference word bit with a corresponding received word bit comprising the segment; and forming a digital correlator output signal at a rate equal to the word segment rate, each output signal comprising a triangular-weighted sum of scaled versions of the ramp-weighted sums and the uniformly-weighted sums over a plurality of preceding word segments covering a predetermined plurality of received words, thereby reducing degradation of the correlator performance causing by Doppler shift modulation on the received signals.

In a preferred embodiment, the output signals are formed over two preceding received words, and the step of forming the correlator output signals comprises:

storing ramp weighted segment sums over the preceding two word periods;

storing uniformly weighted segment sums over the two preceding word periods;

scaling a sequence of the stored ramp weighted segment sums by +1 or −1 to represent the up slope or down slope of triangular weights to achieve the triangular weighting;

scaling a sequence of the stored uniformly weighted segment sums by an appropriate integer value to represent the offset between the ramp and the triangular weighting within the segment;

accumulating the scaled ramp weighted segment sums and the scaled uniformly weighted sums with appropriate normalization factors to provide the correlator output signal for a particular word segment.

A corresponding digital correlator structure is described, which is particularly suited to digital range correlation. The correlator provides increased output data rate over conventional digital correlators, thereby reducing the aliasing of the spectral density of received noise samples. Further, with the increased output data rate, the digital correlator output signals can be digitally filtered with a Doppler frequency filter and/or low pass filters to attenuate the sidebands of uncorrelated signals.

The invention allows the use of digital techniques in a target detection system to provide reduced range sidelobes. Moreover, the use of digital techniques reduces the amount of hardware to build the system.

The invention matches the range sidelobe performance resulting from analog correlation, using digital correlation. Prior to this invention, digital correlation techniques were not necessarily able to match the sidelobe performance of analog correlation.

BRIEF DESCRIPTION OF THE DRAWING

These and other features and advantages of the present invention will become more apparent from the following detailed description of an exemplary embodiment thereof, as illustrated in the accompanying drawings, in which:

FIGS. 4A–4E illustrate how the triangular weighted sums are obtained from a linear combination of the segment sums, for a simple example with four segments per word.

DETAILED DESCRIPTION OF THE PREFERRED EMBODIMENT

A purpose of this invention is to reduce degradation of range sidelobes carried by target Doppler. In other words, the invention maintains low range sidelobes as a function of target Doppler. Two techniques of this invention are employed in a new correlator design to mitigate degradation caused by Doppler shift. The first aspect is an amplitude weighted sum to reduce the frequency sidelobes of the summer response. The second aspect is to increase the correlator output data rate (higher than the word repetition rate) to permit additional digital filtering to attenuate the sidebands of an uncorrelated signal.

Amplitude weighting, in accordance with the first aspect of the invention, in an exemplary embodiment, includes triangular amplitude weighting over two word periods. As a result, the frequency sidelobes of the summer comprising the correlator are reduced by at least 13 dB, and frequency response nulls are the same as the unweighted sum over one word. Moreover, the amplitude weighting requires multiplication by only integers at the high input data bit rate, and is simple to implement with the high data rate summing described below. The range resolution of the correlator is inversely proportional to the bit rate. For fine range resolution, the bit rate is high. The invention seeks to simplify the multiplication operations performed at the high bit rate, because of the time required to perform the multiplication.

An increased data rate out of the correlator summer in accordance with the second aspect of the invention is implemented in an exemplary embodiment by summing over short segments of the word length and storing the segment sums over two word periods. Thus, a segment sum with ramp weighting is formed over each word segment, a segment sum with uniform weighting (unweighted) is formed over each word segment, and the respective segment sums are stored in a shift register memory storing the segment sums over the two most recent word periods.

The triangular weighted sum over two words is derived at the end of each word segment, from the values of the latest, i.e., the fresh, ramp weighted and unweighted segment sums, and from the previous values (within two word periods) of the segment sums which are stored in the shift register memories.

Figure 4A:
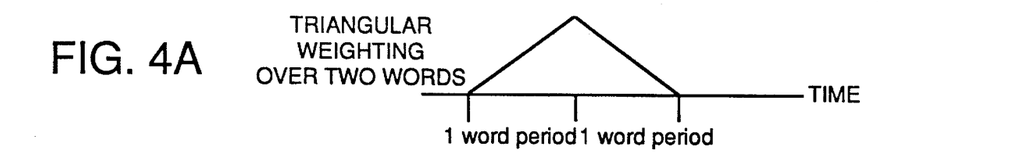
FIG. 4A shows triangular weighting over two word periods.
Figure 4B:
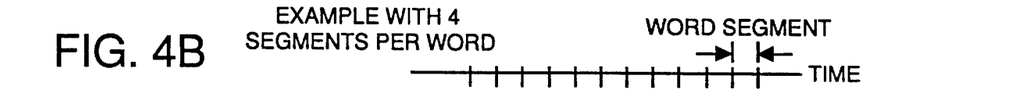
FIG. 4B shows the manner in which a word period is divided into four word segments.
Figure 4C:
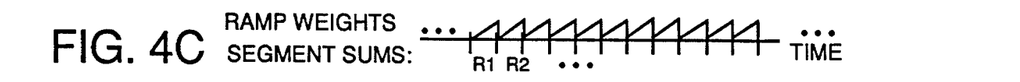
FIG. 4C illustrates the ramp weights to be applied to the word segments R1, R2 . . .
Figure 4D:
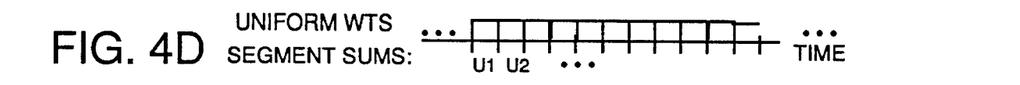
FIG. 4D shows the uniform weights to be applied to the word segments U1, U2 . . .

FIGS. 4A–4E illustrate how the triangular weighted sums are obtained from a linear combination of the segment sums, for a simple example with four segments per word. FIG. 4A shows the concept of triangular weighting over two word periods in accordance with the invention. FIG. 4B shows the manner in which a word period is divided into four word segments. FIG. 4C illustrates the ramp weighted segment sums R1, R2 . . . FIG. 4D shows the uniform weighted (unweighted) segment sums U1, U2 . . . .

Figure 4E:
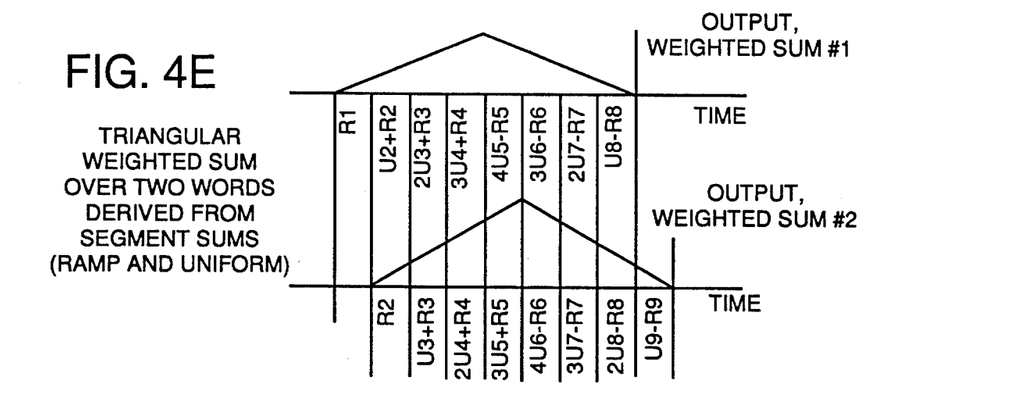
FIG. 4E illustrates how the triangular weighted sum over two words are derived from segment sums of both the ramp and uniform weights.

FIG. 4E shows how the triangular weighted sum over two words is derived from segment sums of both the ramp and uniform weights, for two successive word periods. The weighted output sum #1 is obtained as the sum over the preceding two reference words of scaled segments sums of ramp and unweighted correlated sums. Thus, sum #1 is R1+(U2+R2)+(2 U3+R3)+(3 U4+R4)+(4 U5−R5)+(3 U6−R6)+(2 U7−R7)+(U8−R8). The unweighted sums U1, U2 . . . are scaled to provide the triangular weighting illustrated in FIG. 4A. The sign on R5-R8 is negative to provide the negative slope on the triangular weighting. Sum #2 is formed in a similar manner one word segment in time later, and equals R2+(U3+R3)+(2 U4+R4)+(3 U5+R5)+(4 U6−R6)+(3 U7−R7)+(2 U8−R8)+(U9−R9). Thus, sliding correlator output sums with triangular weighting are formed at successive word segment intervals.

The operation can be generalized to N output samples per word. Thus, the operations performed during each word segment (N segments per word) are the following:

1. accumulate the ramp weighted segment sum; and
2. accumulate the unweighted segment sum.

Operations at the end of each word segment are the following:

1. store the ramp weighted segment sums for two word periods (2N values);
2. store the unweighted segment sums over two word periods, (2N−1 values);
3. scale the sequence of ramp weighted segment sums by +1 or −1, to represent the up slope or down slope of the triangular weights;
4. scale the sequence of unweighted segment sums by the appropriate integer from 1 to N, to represent the offset between the ramp and the triangular weighting within the segment;
5. accumulate the scaled ramp weighted segment sums and the scaled unweighted segment sums over two word periods, with appropriate normalization factors.

Regarding step 2 above, only 2N−1 values of the uniform weighted segment sums need to be stored, since the first (earliest in time) segment of the triangular weighting function can be represented by the ramp-weighted segment sum, without offset (or pedestal). If the first value of the uniform segment sum is stored, its scale factor would be zero.

Figure 5:
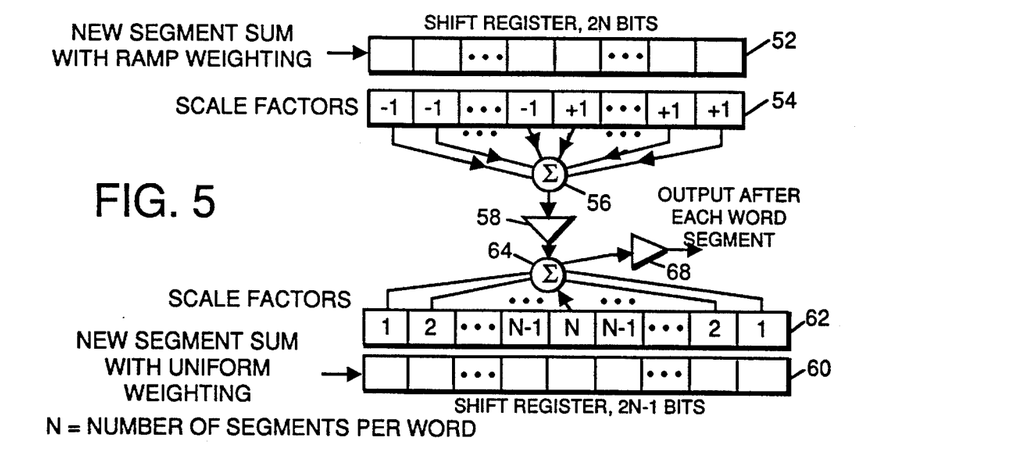
FIG. 5 shows the storage, scaling and accumulation performed in accordance with the invention for the general case of N segments per word.

FIG. 5 shows the storage, scaling and accumulation performed in accordance with the invention for the general case of N segments per word. The new segment sum with ramp weighting is clocked into a shift register 52 having 2N stages or bins. The segment sums are multiplied by the multiplier 54 to apply the scale factors to provide the ramp slope, summed by summer 56 and the sum multiplied by a constant a1 by multiplier 58 to provide the new correlation sum with ramp weighting. Similarly, the new unweighted segment sum is clocked into a second shift register 60 having 2N−1 bins. The integer scale factors to represent the offset between the ramp and the triangular weighting within the segment are applied by the multiplier 62. The scaled unweighted segment sums are summed at summer 64 with the new correlation sum with ramp weighting to provide an output after each word segment. That is, after each word segment, a new output summing over the preceding two reference words is generated. Each output is equivalent to a triangularly weighted correlation sum over the preceding two word periods.

Figure 6:
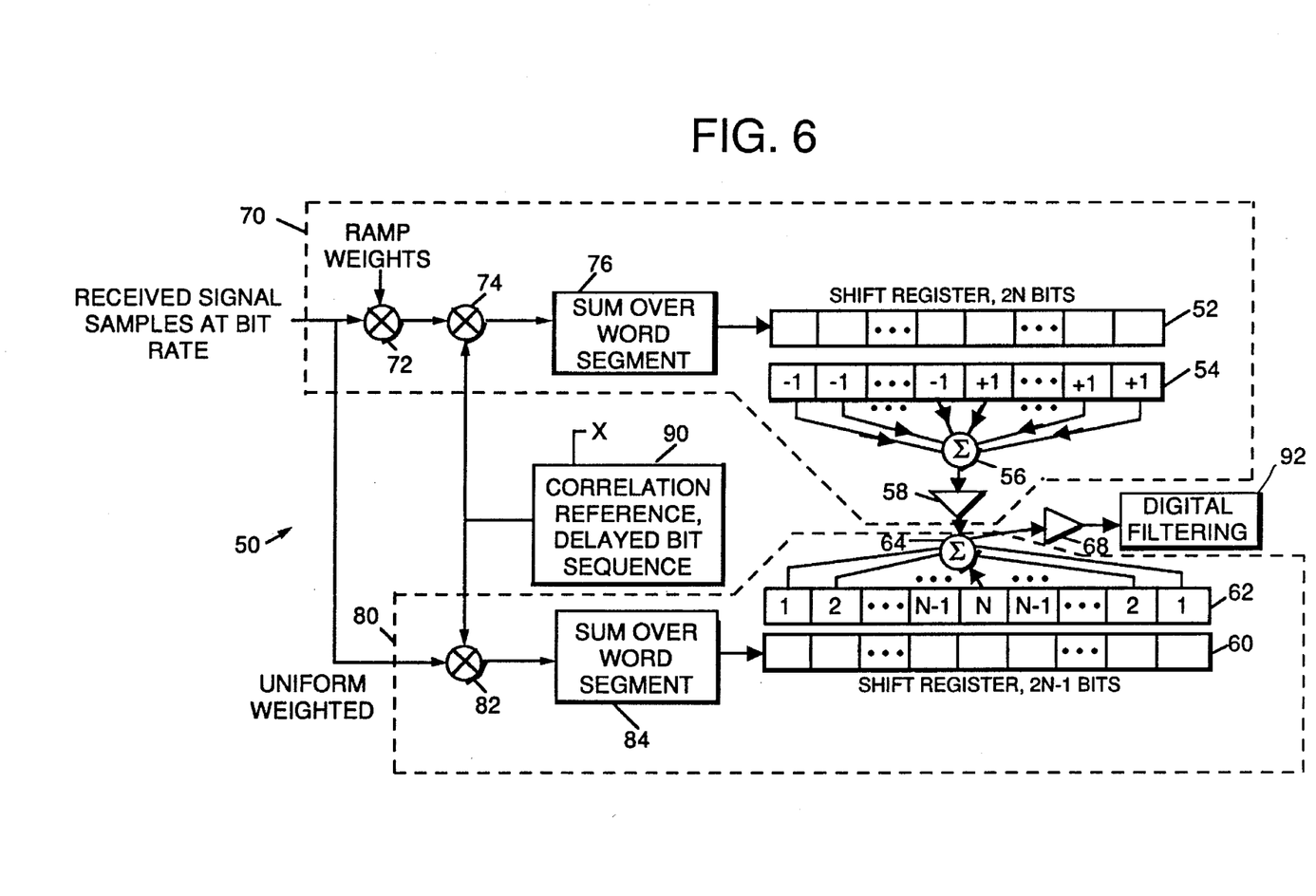
FIG. 6 is a schematic block diagram of a correlator embodying this invention.

The mechanization of the exemplary embodiment employs two channels, one with multiplication for ramp weighting and the other without weight multiplication, for uniform weighting, each channel with multiplication by the reference word bits and summation over every word segment. Channel 70 provides a ramping over each segment of the reference word, while channel 80 provides an offset to each segment. Without this innovation, 2N correlation channels would be required to obtain N output samples per word, and each channel would require multiplication by the triangular weights, multiplication by the reference bits and summation over two word periods.

A schematic diagram of the new correlator design is presented in FIG. 6, for a general case of L bits per word and N segments per word. This correlator 50 may be employed in the target detection system of FIG. 1 in place of the correlator 30. The ramp weights, scale factors and normalization factors for this general case are obtained as follows. Assume L=the number of bits in a code word, N=the number of segments per word, and L is an integer multiple of N, such that there are L/N bits per word segment. For triangular weights between $1/[2L]$ and $1-1/[2L]$, the ramp weights $W(k)=2k-1$, for $k=1$ to $L/N$, where L/N is an integer, and k=the sample number within a word segment. The ramp weights are repeated for each segment. The normalization factor $a1=N/[2L]$. The normalization factor $a2=1/N$.

Figure 7:
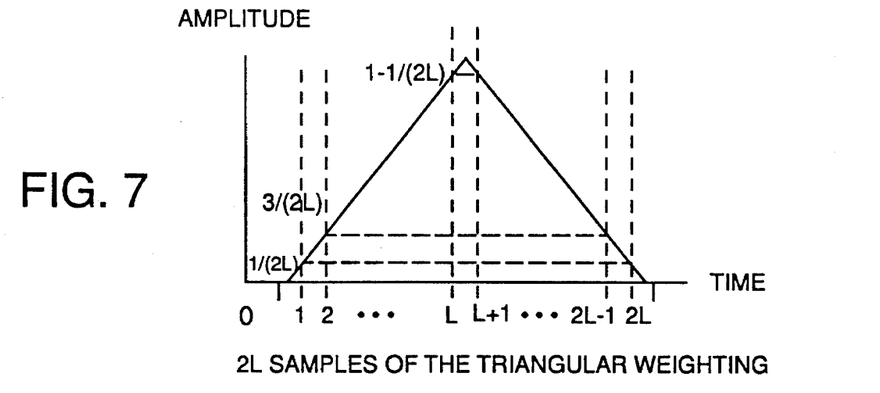
FIG. 7 shows the triangular weighting amplitude as a function of time.

The triangular weighting function has amplitude between 0 and 1, to yield the same correlation gain as the uniform weighted correlation sum. There are 2L sample values of the triangular weighting function over the two word periods. FIG. 7 illustrates the triangular weighting function and the sample times within the two word periods. With the sample time taken for mirror symmetry about the center of the triangle, the sample values range from $1/(2L)$ to $1-1/(2L)$. The ramp values, scale factors, and normalization factors are specified to yield the sample values of the triangle.

The effective values for the triangular weighting for each of the 2L samples in the two word periods is obtained by:

$$[A+B \cdot W(k) \cdot a1] \cdot a2$$

where

A=scale factor (1 to N) for the uniform weighted segment sums

B=scale factor (±1) for the ramp weighted segment sums

W(k)=ramp values k=sample number within a segment a1=N/(2L)=normalization factor a2=1/N=normalization factor Table I shows that the desired triangle values are obtained for the specified ramp values, scale factors, and normalization factors.

TABLE I

Triangle Value = $[A + B \cdot W(k) \cdot a2] \cdot a2$ where $a1 = n/(2L)$, $a2 = 1/N$

| segment number | scale factor A, (uniform) | scale factor B, (ramp) | sample number K | ramp value, W(k) | triangle value |
|---|---|---|---|---|---|
| 1 | 0 | +1 | 1 | 1 | 1/(2L) |
|  |  |  | 2 | 3 | 3/(2L) |
|  |  |  | . . . | . . . | . . . |

TABLE I-continued

Triangle Value = [A + B · W(k) ·a2] · a2 where a1 = n/(2L), a2 = 1/N

| segment number | scale factor A, (uniform) | scale factor B, (ramp) | sample number K | ramp value, W(k) | triangle value |
|---|---|---|---|---|---|
|   |   |   | L/N − 1 | 2L/N − 3 | 1/N − 3/(2L) |
|   |   |   | L/N | 2L/N − 1 | 1/N − 1/(2L) |
| 2 | 1 | +1 | 1 | 1 | 1/N + 1/(2L) |
|   |   |   | 2 | 3 | 1/N + 3/(2L) |
|   |   |   | ... | ... | ... |
|   |   |   | L/N − 1 | 2L/N − 3 | 2/N − 3/(2L) |
|   |   |   | L/N | 2L/N − 1 | 2/N − 1/(2L) |
| ... | ... | ... | ... | ... | ... |
| N | N − 1 | +1 | 1 | 1 | 1 − 1/N + 1/(2L) |
|   |   |   | 2 | 3 | 1 − 1/N + 3/(2L) |
|   |   |   | ... | ... | ... |
|   |   |   | L/N − 1 | 2L/N − 3 | 1 − 3/(2L) |
|   |   |   | L/N | 2L/N − 1 | 1 − 1/(2L) |
| N + 1 | N | −1 | 1 | 1 | 1 − 1/(2L) |
|   |   |   | 2 | 3 | 1 − 1/(2L) |
|   |   |   | ... | ... | ... |
|   |   |   | L/N − 1 | 2L/N − 3 | 1 − 1/N + 3/(2L) |
|   |   |   | L/N | 2L/N − 1 | 1 − 1/N + 1/(2L) |
| ... | ... | ... | ... | ... | ... |
| 2N − 1 | 2 | −1 | 1 | 1 | 2/N − 1/(2L) |
|   |   |   | 2 | 3 | 2/N − 3/(2L) |
|   |   |   | ... | ... | ... |
|   |   |   | L/N − 1 | 2L/N − 3 | 1/N + 3/(2L) |
|   |   |   | L/N | 2L/N − 1 | 1/N + 1/(2L) |
| 2N | 1 | −1 | 1 | 1 | 1/N − 1/(2L) |
|   |   |   | 2 | 3 | 1/N − 3/(2L) |
|   |   |   | ... | ... | ... |
|   |   |   | L/N − 1 | 2L/N − 3 | 3/(2L) |
|   |   |   | L/N | 2L/N − 1 | 1/(2L) |

The gain through the correlator can be changed without affecting performance, as long as the output is within the dynamic range of the processor. The ramp values, scale factors, and normalization factors may be adjusted to obtain a different gain. For example, if the final normalization factor a2 is omitted, the voltage gain of the triangular weighted correlation sum will be N times greater than the gain of a uniformly weighted correlation sum. The total gain may also be distributed differently among the ramp values, scale factors and normalization factors. The particular values were specified for mechanization with only integer multiplication earlier in the processing where the data rates are higher, and non-integer multiplication or division performed late in the processing where the data rate is lower.

The sample values of the triangle are not computed or stored. The ramp values, scales factors and normalization factors are chosen to yield the same output sum as would have been obtained if the 2L input samples had been multiplied by the 2L values of the triangle function.

As shown in FIG. 6, the received signal samples are provided at the bit rate, e.g., from the output of a receiver as in the system of FIG. 1. These samples are provided to the two correlator channels 70 and 80. Channel 70 is the ramp weighting channel, so that the samples are multiplied at multiplier 72 by the weights W(k) for a given word segment. The weighted samples are then multiplied by the corresponding bit of the delayed correlation reference word 90. This product is summed over the k samples of the word segment by accumulator 76 to provide the new segment sum with ramp weighting. The process is then repeated with each succeeding segment sum.

Channel 80 is the channel with uniform weighting. Thus, the received signal samples are not multiplied by weights, i.e., unweighted, and are multiplied at multiplier 82 by the corresponding bit of the delayed correlation reference word 90. The product of this multiplication is then summed over the word segment by the accumulator 84 to provide the new segment sum with uniform weighting.

At the end of each word segment, the new segment sums with ramp weighting and with uniform weighting are clocked into the input bin of the respective shift register 52 and 62, as described with respect to FIG. 5. The sequence of 2N segments in register 52 is then scaled by multiplier 54 to apply the appropriate slope, the scaled segments are summed at summer 56 and the normalization factor a1 is applied to this sum by normalizer 58. The sequence of 2N−1 segments in register 62 is scaled by multiplier 62, and the scaled segments are summed together and with the output of the normalizer 58. This composite sum is normalized by factor a2 at normalizer 68 to provide a correlator output. Since a fresh output is provided after each word segment, there are N correlator outputs provided for each word. The correlator outputs are passed through digital filter 92 and then subjected to further conventional target processing.

Figure 8:
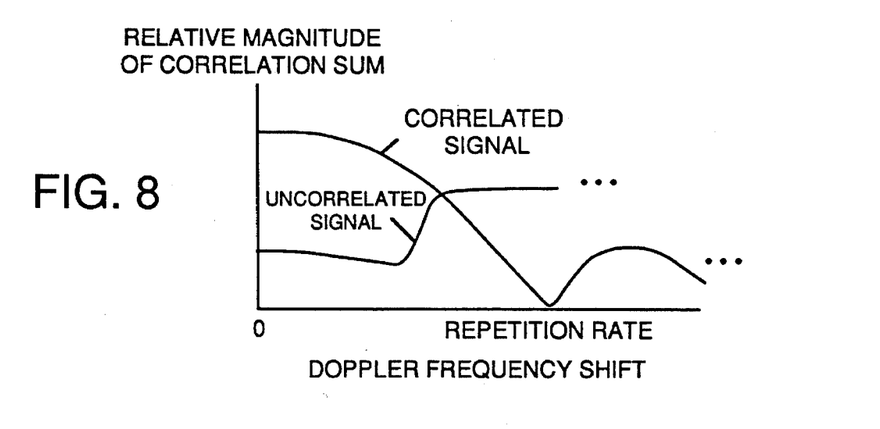
FIG. 8 illustrates the relative magnitude of the correlator sum for both correlated signals and uncorrelated signals as a function of Doppler frequency shift, for the case in which Doppler filtering is implemented after the correlator.
Figure 13:
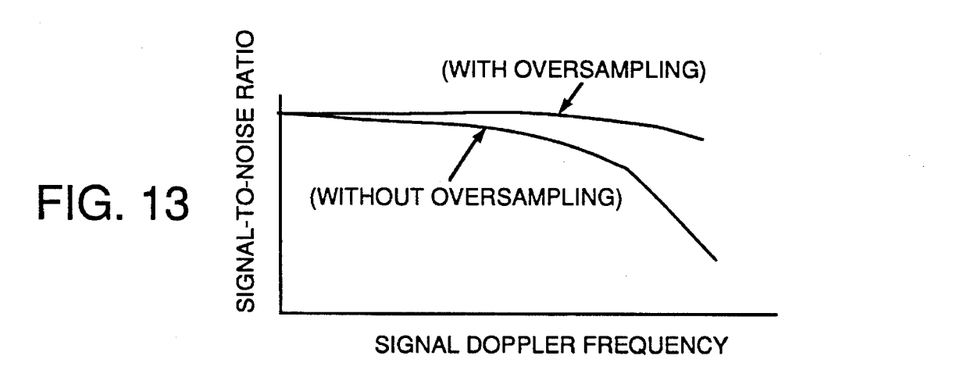
FIG. 13 illustrates signal-to-noise ratio as a function of signal Doppler frequency for conventional correlator output rates and at the oversampling output data rate in accordance with the invention.

The filter 92 can be a Doppler (i.e., narrowband) filter, in which case the correlator has improved signal to noise ratio over that of conventional correlators as illustrated in FIG. 13. The triangular weighted correlation sum at the output of the correlator 50 maintains the relative difference in output levels for correlated and uncorrelated signals over a wider band of signal Doppler frequencies, as illustrated in FIG. 8. Rejection of unwanted signals (such as surface clutter) is maintained over the wider band of frequencies.

Figure 9:
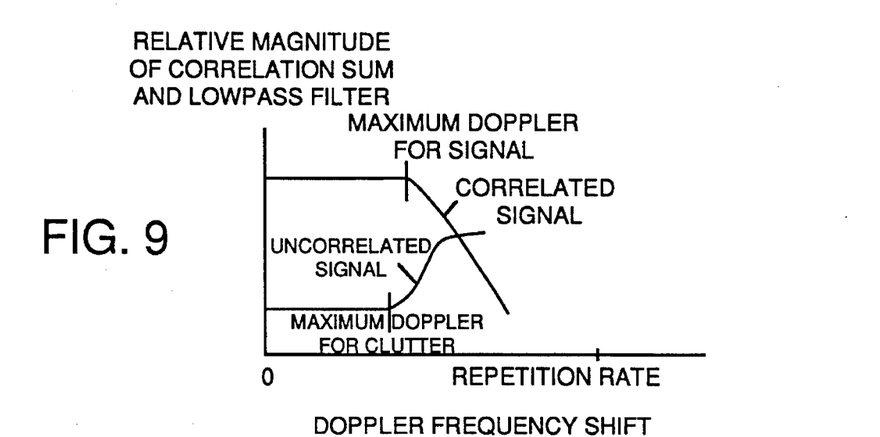
FIG. 9 illustrates the relative magnitude of the correlator sum and lowpass filter as a function of Doppler frequency shift, for the case in which the correlator is not followed by Doppler filtering.

The increase in correlator output data rate, i.e., at N times the word repetition rate, permits the use of additional lowpass filtering to attenuate the sidebands of uncorrelated signals. Additional lowpass filtering before Doppler filtering can be designed to compensate for the attenuation of the correlated signal versus Doppler frequency. The output of such a lowpass filter is illustrated in FIG. 9.

Figure 10:
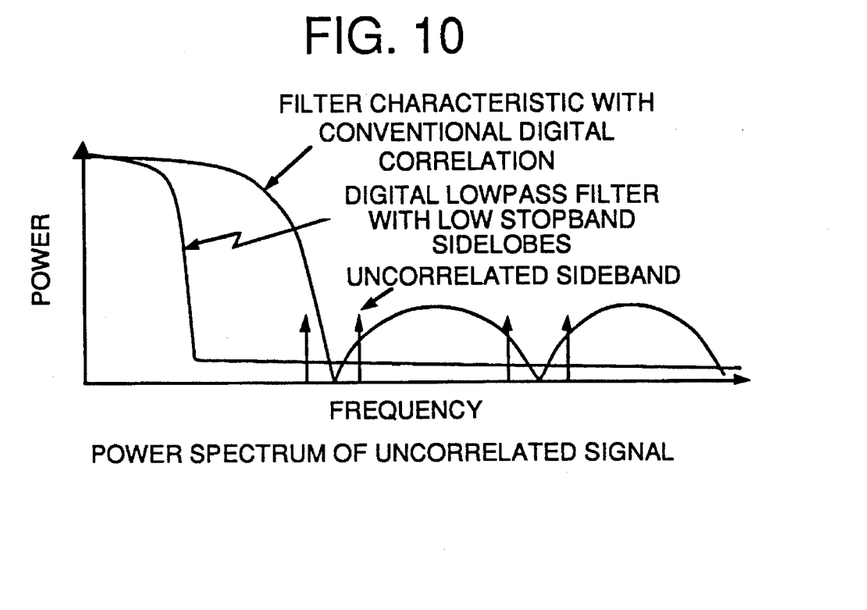
FIG. 10 illustrates the power spectrum of an uncorrelated signal, the filter characteristic with a conventional digital correlator, and the filter characteristic with digital low pass filtering.

The uncorrelated spectral lines are attenuated by oversampling and digital filtering, as shown in FIG. 10, which illustrates the power spectrum of the uncorrelated signal. As shown the digital correlation provides significantly more attenuation of uncorrelated sidebands using oversampling and digital filtering.

Figure 11:
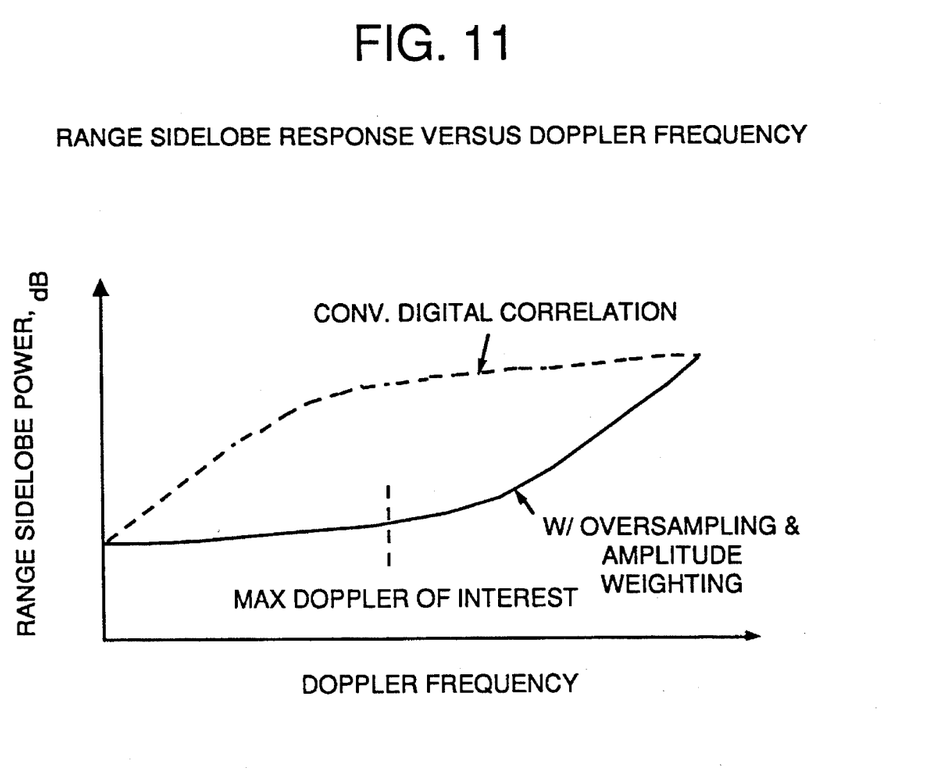
FIG. 11 illustrates how the low range sidelobes are maintained as a function of Doppler frequency.

FIG. 11 illustrates how the low range sidelobes are maintained as a function of Doppler frequency. The dotted lines show how range sidelobes increase as a function of target Doppler using conventional correlation techniques. The solid line shows the lower sidelobes are maintained as target Doppler frequency increases using digital correlating techniques.

The present invention takes advantage of the properties of the triangular amplitude weighing to reduce the number of correlators required to two. One correlator provides a ramping over each segment of the code word, while the other correlator provides an offset to each segment.

Figure 12:
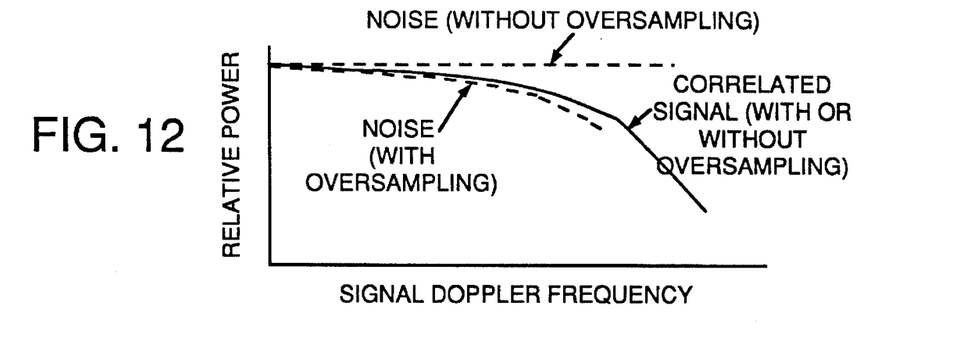
FIG. 12 illustrates noise spectral density as a function of signal Doppler frequency for several conditions.

Besides reducing range sidelobes, this invention offers signal-to-noise ratio enhancement over conventional digital correlation. The higher output data rate reduces the aliasing of the spectral density of receiver noise samples. The noise spectral density will decrease with increasing frequency in nearly the same manner as the correlated signal power decreases (as illustrated in FIG. 12) with increasing signal Doppler frequency. If Doppler filtering is performed after correlation, the signal-to-noise ratio will be nearly independent of the signal Doppler frequency. Conventional digital correlation without oversampling (i.e., with a correlator output data rate at the reference word rate) produces a white noise power spectrum. If Doppler filtering is performed after conventional digital correlation, significant signal-to-noise ratio losses occur as signal Doppler frequency increases. FIG. 12 shows the correlated signal and receiver noise power spectra resulting from digital correlation with and without oversampling. FIG. 13 shows the signal-to-noise ratio in a Doppler filter when digital Doppler filtering follows digital correlation, with and without oversampling.

Figure 14:
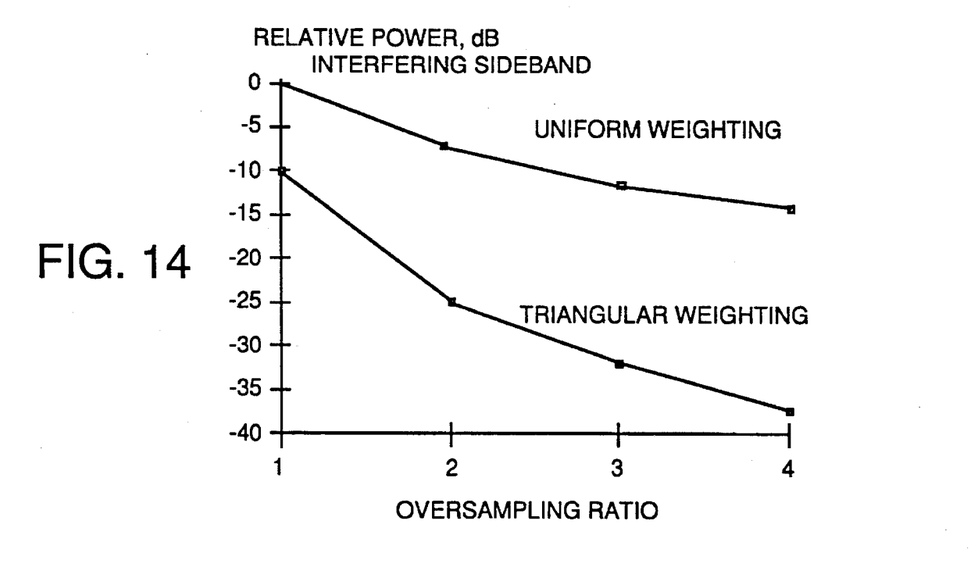
FIG. 14 is a plot of the relative power in interfering sidelobes as a function of the oversampling ratio.
Figure 15A:
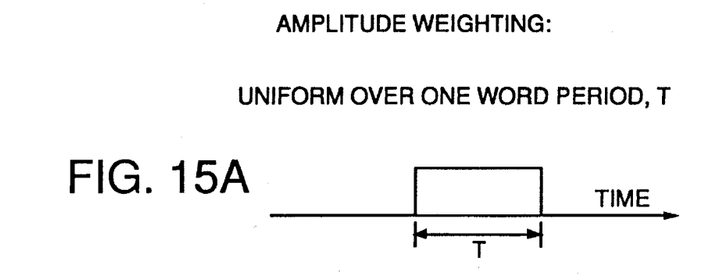
FIGS. 15A–15C illustrate amplitude weighting respectively for the uniform weighting, triangular weighting over two word periods and triangular weighting over the general case of M word periods, where M is greater than two.
Figure 15B:
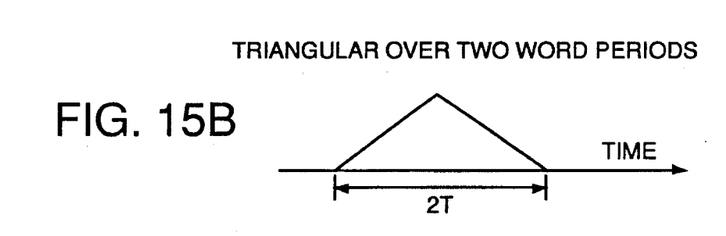
Figure 15C:
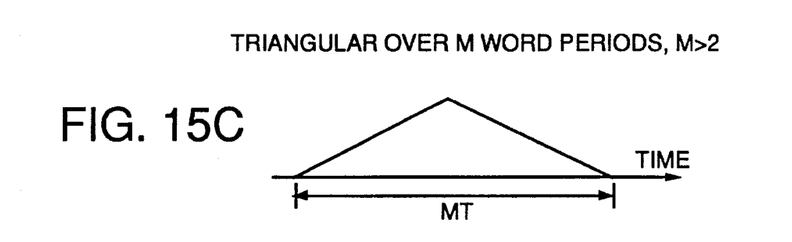
Figure 16A:
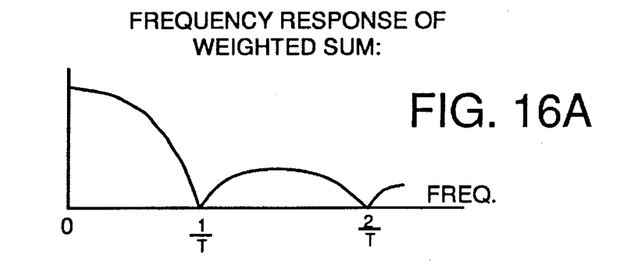
FIGS. 16A–16C illustrate the frequency response of the weighted correlator sum corresponding to the three amplitude weighting cases of FIGS. 15A–15C, respectively.
Figure 16B:
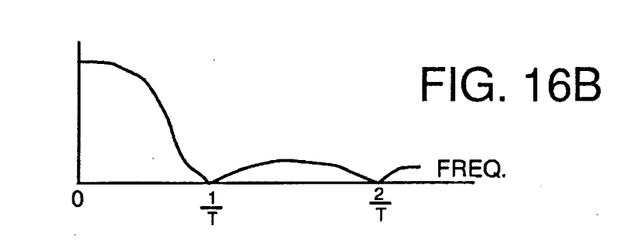
Figure 16C:
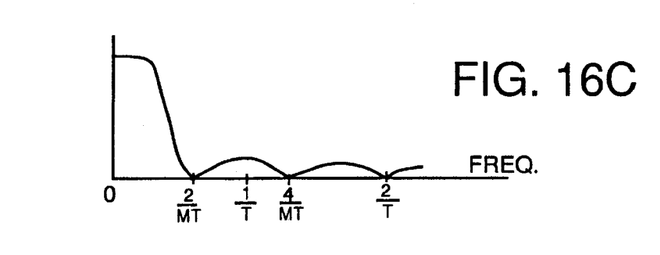

FIG. 14 shows the relative power of a sideband of the uncorrelated signal which appears at the same frequency as the signal Doppler shift, because of the aliasing when the sample rate is less than the frequency of the sideband. The relative power is plotted as a function of the oversampling ratio (output data rate divided by the word repetition rate) for both the uniform weighted correlation sum and the triangular weighted sum. The curve for uniform weighting shows that the first interfering sideband is attenuated as the oversampling ratio is increased, but the rate of decrease is small. With triangular weighting, the interfering sideband is about 10 dB lower even without oversampling, but the sideband power decreases rapidly when oversampling is employed.

Without the triangular weighting, much higher oversampling ratios are required to match the performance of the mechanization using both triangular weighting and oversampling. For the same attenuation of the first interfering sideband:

| oversampling ratio with triangular weighting | oversampling ratio with uniform weighting |
| --- | --- |
| 1 | 3 |
| 2 | 8 |
| 3 | 19 |
| 4 | 38 |

FIGS. 15A–15C and 16A–16C show the frequency response for the correlation sum with uniform weighting, triangular weighting over two periods, and triangular weighting over M periods.

The desired frequency response has nulls at the repetition rate, $F_r=1/T$, and its harmonics, where T is the word period, to reject the sidebands of uncorrelated interference with zero Doppler shift. For example, the signal which leaks directly from the transmitter into the receiver has zero Doppler shift and is uncorrelated. Moreover, the desired frequency response has no nulls below the maximum expected Doppler shift of the target to avoid losing the correlated target signal in a null. The requirement for nulls at the repetition rate and harmonics is achieved for the uniform weighting over one word period, the triangular weighting over two periods, and the triangular weighting over M periods, only if M is even.

If M=4, the first null occurs at one-half the repetition rate. If the maximum target Doppler shift is near or greater than $F_r/2$, then M greater than 2 cannot be used.

Triangular weighting over two word periods is employed for the illustrated embodiment. A different design choice may be made for a different application.

It is understood that the above-described embodiments are merely illustrative of the possible specific embodiments which may represent principles of the present invention. For example, the ramp weights may incorporate the scale factors a1 and a2. In this case the ramp weights are equal to $W(k)=(2k-1)/[2(L+1)]$, for k=1 to L/N. Other arrangements may readily be devised in accordance with these principles by those skilled in the art without departing from the scope and spirit of the invention.

What is claimed is:

1. A method for performing correlation of a succession of received digital words in a serial bit stream with a reference digital word of bit length L having a reference word period, comprising the following steps:

providing a set of ramp weights W(k), where k=1 to L/N, where N is a number of word segments comprising said received digital word, each word segment having L/N bits;

forming a ramp-weighted sum over each of said N word segments, said sum comprising the sum of a product of a reference word bit with a product of a corresponding received bit comprising said segment with a ramp weight W(k);

forming a uniformly-weighted sum over each of said N word segments, said sum comprising the sum of a product of a reference word bit with a corresponding received word bit comprising said segment; and forming a digital correlator output signal at a rate equal to the word segment rate, each output signal comprising a triangular-weighted sum of scaled versions of said ramp-weighted sums and said uniformly-weighted sums over a plurality of preceding word segments covering a predetermined plurality of received words, whereby degradation of said correlator performance caused by Doppler shift modulation on said received signals is reduced.

2. The method of claim 1 further comprising the step of digitally filtering said digital correlator output signals with a Doppler frequency, narrow band filter to enhance signal-to-noise ratio.

3. The method of claim 1 further comprising the step of digitally filtering said digital correlator output signals with a digital low-pass filter to attenuate sidebands of uncorrelated signals.

4. The method of claim 1 wherein said ramp weights $W(k)=2k-1$, k=1 to L/N.

5. The method of claim 1 wherein L/N is an integer.

6. The method of claim 1 wherein said step of forming said correlator output signals comprises:
  storing ramp weighted segment sums over said plurality of word periods;
  storing uniformly weighted segment sums over said plurality of word periods;
  scaling a sequence of said stored ramp weighted segment sums by +1 or −1 to represent the up slope or down slope of triangular weights to achieve said triangular weighting;
  scaling a sequence of said stored uniformly weighted segment sums by an appropriate integer value to represent an offset between a ramp and said triangular weighting within said segment;
  accumulating said scaled ramp weighted segment sums and said scaled uniformly weighted sums with appropriate normalization factors to provide said correlator output signal for a particular word segment.

7. The method of claim 6 wherein said predetermined plurality of received words is two received words, wherein 2N values of said ramp weighted segment sums are stored, scaled and accumulated, and wherein 2N−1 values of said uniformly weighted segment sums are stored, scaled and accumulated.

8. The method of claim 7 wherein said stored uniformly weighted sums are scaled by appropriate integers ranging from 1 to N.

9. The method of claim 6 wherein said scaled, stored ramp-weighted segment sums are accumulated to provide a ramp-weighted accumulated value, and a normalization factor a1 is applied to said ramp-weighted accumulated value.

10. The method of claim 9 wherein said ramp weights $W(k)=2k-1$, k=1 to L/N, and said normalization factor $a1=N/[2L]$.

11. The method of claim 10 wherein said scaled, stored uniformly-weighted segment sums are accumulated with said ramp-weighted accumulated value to provide a correlator accumulator value, a normalization factor a2 is applied to said accumulator value to provide said correlator output signal, and said normalization value=1/N.

12. The method of claim 1 wherein said plurality of received words over which said correlator output signal is formed is two received words.

13. A digital correlator for correlating a succession of received digital words in a serial bit stream with a reference digital word of bit length L having a reference word period, the correlator comprising:
  means for providing a set of ramp weights W(k), where k=1 to L/N, where N is a number of word segments comprising said received digital word, each word segment having L/N bits;
  ramp-weighting summing means for forming a ramp-weighted sum over each of said N word segments, said summing means comprising means for accumulating the respective sums of a product of a reference word bit with a product of a corresponding received bit comprising said segment with a ramp weight W(k) for each bit comprising said word segment;
  uniformly-weighting summing means for forming a uniformly-weighted sum over each of said N word segments, said summing means comprising means for accumulating the respective sums of a product of a reference word bit with a corresponding received word bit for each bit comprising said word segment; and
  means for forming a digital correlator output signal at a rate equal to the word segment rate, each output signal comprising a triangular-weighted sum of scaled versions of said ramp-weighted sums and said uniformly-weighted sums over a plurality of preceding word segments covering a predetermined plurality of received words,
  whereby degradation of said correlator performance caused by Doppler shift modulation on said received signals is reduced.

14. The correlator of claim 13 further comprising means for digitally filtering said digital correlator output signals with a Doppler frequency, narrow band filter to enhance signal-to-noise ratio.

15. The correlator of claim 13 further comprising means for digitally filtering said digital correlator output signals with a digital low-pass filter to attenuate sidebands of uncorrelated signals.

16. The correlator of claim 13 wherein said ramp weights $W(k)=2k-1$, k=1 to L/N.

17. The correlator of claim 13 wherein L/N is an integer.

18. The correlator of claim 13 wherein means for forming said correlator output signals comprises:
  first storing means for storing each of said ramp weighted segment sums over said plurality of word periods;
  second storing means for storing uniformly weighted segment sums over said plurality of word periods;
  first scaling means for scaling a sequence of said stored ramp weighted segment sums by +1 or −1 to represent the up slope or down slope of triangular weights to achieve said triangular weighting;
  second scaling means for scaling a sequence of said stored uniformly weighted segment sums by an appropriate integer value to represent an offset between a ramp and said triangular weighting within said segment;
  accumulating means for accumulating said scaled ramp weighted segment sums and said scaled uniformly weighted sums with appropriate normalization factors to provide said correlator output signal for a particular word segment.

19. The correlator of claim 18 wherein said first storing means comprises a first shift register, and said second storing means comprises a second shift register.

20. The correlator of claim 18 wherein said predetermined plurality of received words is two received words, wherein 2N values of said ramp weighted segment sums are stored, scaled and accumulated, and wherein 2N-1 values of said uniformly weighted segment sums are stored, scaled and accumulated.

21. The correlator of claim 20 wherein said second storing means comprises means for scaling said stored uniformly weighted sums by appropriate integers ranging from 1 to N.

22. The correlator of claim 18 wherein said scaled, stored ramp-weighted segment sums are accumulated to provide a ramp-weighted accumulated value, and further comprising means for applying a normalization factor a1 to said ramp-weighted accumulated value.

23. The correlator of claim 22 wherein said ramp weights $W(k)=2k-1$, k=1 to L/N, and said normalization factor $a1=N/[2L]$.

24. The correlator of claim 23 wherein said scaled, stored uniformly-weighted segment sums are accumulated by with said ramp-weighted accumulated value by said accumulator to provide a correlator accumulator value, and said correlator further comprises means for applying a normalization factor a2 to said accumulator value to provide said correlator output signal, and said normalization value=1/N.

25. The correlator of claim 13 wherein said plurality of received words over which said correlator output signal is formed is two received words.

26. A method for performing correlation of a succession of received digital words in a serial bit stream with a reference digital word of bit length L having a reference word period, comprising the following steps:

forming a word segment sum over each of N word segments comprising said word, said segment sum comprising the sum over said word segment bits of products of each received word bit comprising said word segment with a corresponding reference word bit; and forming a digital correlator output signal at a rate equal to the word segment rate, said forming step including accumulating each segment sum over a plurality of preceding word segments covering a predetermined plurality of received words, whereby degradation of said correlator performance caused by Doppler shift modulation on said received signals is reduced.

27. The method of claim 26 further comprising the step of digitally filtering said digital correlator output signals with a Doppler frequency, narrow band filter to enhance signal-to-noise ratio.

28. The method of claim 26 further comprising the step of digitally filtering said digital correlator output signals with a digital low-pass filter to attenuate sidebands of uncorrelated signals.

29. The method of claim 26 wherein said predetermined plurality of received words is two received words.

30. A method for performing correlation of a succession of received digital words in a serial bit stream with a reference digital word of bit length L having a reference word period, comprising the following steps:

forming a ramp-weighted sum over a plurality of received digital words, said sum comprising the sum of a product of a reference word bit with a product of a corresponding received bit with a ramp weight W(k);

forming a uniformly-weighted sum over said plurality of received digital words, said sum comprising the sum of a product of a reference word bit with a corresponding received word bit; and forming a digital correlator output signal, each output signal comprising a triangular-weighted sum of scaled versions of said ramp-weighted sums and said uniformly-weighted sums over said predetermined plurality of received words, whereby degradation of said correlator performance caused by Doppler shift modulation on said received signals is reduced.

31. The method of claim 30 further comprising the step of digitally filtering said digital correlator output signals with a Doppler frequency, narrow band filter to enhance signal-to-noise ratio.

32. The method of claim 30 further comprising the step of digitally filtering said digital correlator output signals with a digital low-pass filter to attenuate sidebands of uncorrelated signals.

33. A range correlator for target detection, comprising:

a transmitter for transmitting a transmit signal modulated by a digital reference word of bit length L;

a receiver responsive to reflected transmitted signals which have been reflected from a target, said receiver including a means for providing a digital bit stream of digital signals recovered from said reflected transmitted signals; and a digital correlator responsive to said receiver digital bit stream, comprising:

means for providing a set of ramp weights W(k), where k=1 to L/N, where N is a number of word segments comprising said received digital word, each word segment having L/N bits;

ramp-weighting summing means for forming a ramp-weighted sum over each of said N word segments, said summing means comprising means for accumulating the respective sums of a product of a reference word bit with a product of a corresponding received bit comprising said segment with a ramp weight W(k) for each bit comprising said word segment;

uniformly-weighting summing means for forming a uniformly-weighted sum over each of said N word segments, said summing means comprising means for accumulating the respective sums of a product of a reference word bit with a corresponding received word bit for each bit comprising said word segment; and means for forming a digital correlator output signal at a rate equal to the word segment rate, each output signal comprising a triangular-weighted sum of scaled versions of said ramp-weighted sums and said uniformly-weighted sums over a plurality of preceding word segments covering a predetermined plurality of received words, whereby degradation of said correlator performance caused by Doppler shift modulation on said received signals is reduced.

34. The correlator of claim 33 further comprising means for digitally filtering said digital correlator output signals with a Doppler frequency, narrow band filter to enhance signal-to-noise ratio.

35. The correlator of claim 33 further comprising means for digitally filtering said digital correlator output signals with a digital low-pass filter to attenuate sidebands of uncorrelated signals.

36. The correlator of claim 33 wherein said ramp weights W(k)=2k−1, k=1 to L/N.

37. The correlator of claim 33 wherein L/N is an integer.

38. The correlator of claim 33 wherein means for forming said correlator output signals comprises:

first storing means for storing each of said ramp weighted segment sums over said plurality of word periods;

second storing means for storing uniformly weighted segment sums over said plurality of word periods;

first scaling means for scaling a sequence of said stored ramp weighted segment sums by +1 or −1 to represent the up slope or down slope of triangular weights to achieve said triangular weighting;

second scaling means for scaling a sequence of said stored uniformly weighted segment sums by an appropriate integer value to represent an offset between a ramp and said triangular weighting within said segment;

accumulating means for accumulating said scaled ramp weighted segment sums and said scaled uniformly weighted sums with appropriate normalization factors to provide said correlator output signal for a particular word segment.

39. The correlator of claim 38 wherein said first storing means comprises a first shift register, and said second storing means comprises a second shift register.

40. The correlator of claim 38 wherein said predetermined plurality of received words is two received words, wherein 2N values of said ramp weighted segment sums are stored, scaled and accumulated, and wherein 2N-1 values of said uniformly weighted segment sums are stored, scaled and accumulated.

41. The correlator of claim 40 wherein said second storing means comprises means for scaling said stored uniformly weighted sums by appropriate integers ranging from 1 to N.

42. The correlator of claim 38 wherein said scaled, stored ramp-weighted segment sums are accumulated to provide a ramp-weighted accumulated value, and further comprising means for applying a normalization factor a1 to said ramp-weighted accumulated value.

43. The correlator of claim 42 wherein said ramp weights W(k)=2k−1, k=1 to L/N, and said normalization factor a1=N/[2L].

44. The correlator of claim 43 wherein said scaled, stored uniformly-weighted segment sums are accumulated by with said ramp-weighted accumulated value by said accumulator to provide a correlator accumulator value, and said correlator further comprises means for applying a normalization factor a2 to said accumulator value to provide said correlator output signal, and said normalization value=1/N.

45. The correlator of claim 43 wherein said plurality of received words over which said correlator output signal is formed is two received words.

* * * * *